United States Patent Office 2,940,860
Patented June 14, 1960

2,940,860
PROCESS FOR STABILIZING MAYONNAISE AND THE RESULTING PRODUCT

Ben L. Sarett, 11361 Isleta St., Los Angeles, Calif.

No Drawing. Filed Jan. 16, 1958, Ser. No. 709,184

6 Claims. (Cl. 99—163)

This invention relates to the preparation of a mayonnaise product and has for an object the provision of a mayonnaise which is stabilized against deterioration upon storage.

As is well known, mayonnaise comprises essentially an emulsion of a vegetable oil and an acidified aqueous medium containing substantial quantities of egg yolk which latter serves as the emulsifying agent and contributes to the food value of the product. The mayonnaise product usually has dispersed therein minute bubbles of a gas such as air as a result of the mixing process. It is well known that the shelf life of mayonnaise is somewhat indefinite and that after a period of several months of storage the mayonnaise may have a tendency to deteriorate because of oxidative effects.

There are a number of chemical antioxidants that are now available. However, none have been successfully used to combat the oxidative deterioration that takes place in mayonnaise upon storage. There is one known antioxidant which suggests itself in connection with the stabilization of mayonnaise, and this is the enzymatic preparation which contains glucose oxidase and catalase, all as described in Dwight L. Baker Reissue Patent No. 23,523, dated July 22, 1952. In that patent it has been disclosed that various types of food products containing small amounts of glucose may be stabilized against oxidative deterioration by incorporating thereinto small amounts of glucose oxidase and catalase. However, it has now been discovered that certain of the commercially available preparations containing glucose oxidase and catalase are not entirely suitable for use in connection with the treatment of mayonnaise since these commercial preparations, while preventing oxidative deterioration, also produce other side effects which may result in the breakdown of the mayonnaise emulsion and subsequent oil separation upon storage for long periods of time.

Accordingly, it is a further object of this invention to provide a mayonnaise composition stabilized against deterioration by oxidation.

A still further object of this invention is the provision of a mayonnaise composition stabilized with an enzyme preparation containing glucose oxidase and catalase, which preparation has been pretreated in a manner to prevent adverse side reactions in the mayonnaise.

A still further object of this invention is the provision of a process for producing a mayonnaise product which has an increased shelf life.

Further and additional objects will appear from the following description and the appended claims.

In accordance with one embodiment of this invention, a mayonnaise is provided which has been stabilized by the addition thereto of a small amount of a glucose oxidase-catalase preparation which latter, prior to the time that it is added to the mayonnaise, has been heated to a temperature between about 50° and 80° C. in order to inactivate certain impurities contained therein without destroying the glucose oxidase or the catalase present. The invention is particularly applicable in connection with the glucose oxidase-containing preparations that are now commercially available. As is well known, mayonnaise comprises essentially an emulsion of an edible vegetable oil, water and egg yolk, and also usually contains a considerable volume of air dispersed therein. As will be apparent from a consideration of the aforementioned Baker Reissue Patent No. 23,523, glucose is necessary in the substrate in order for the glucose oxidase and catalase enzyme system to protect the mayonnaise against oxidative deterioration. In the case of mayonnaise, this glucose is supplied by the egg yolk since glucose is a naturally occurring constituent of egg yolks although additional glucose may be added if desired. It will also be apparent that the mayonnaise may include other ingredients, such as sucrose, vinegar, citric acid, salt, mustard flour, and other flavoring agents.

In the manufacture of the mayonnaise in accordance with this invention, it is preferred that the concentration of the glucose oxidase in the final mayonnaise preparation be in excess of about 10 units of glucose oxidase per pound of finished mayonnaise, and preferably the concentration is between about 20 and 200 units per pound. The catalase need be present only in very minute quantities, as little as one unit per pound of mayonnaise being satisfactory, but much larger quantities may, of course, be used without adversely affecting the product. The units of glucose oxidase and catalase referred to are intended to mean, respectively, the units essentially as defined in Dwight L. Baker Patent No. 2,651,592, dated September 8, 1953. The commercial glucose oxidase preparations normally contain a small amount of catalase, and it is ordinarily not necessary to add any of this enzyme from another source. Only sufficient catalase is required to catalyze the breakdown of hydrogen peroxide to oxygen and water in accordance with the theoretical equations set forth in the Baker Reissue patent.

As indicated above, the commercial glucose oxidase-containing preparation is subject to a pretreatment before it is used in the stabilization of mayonnaise. Thus, in accordance with this invention, the impure enzyme preparation derived from molds, as disclosed in the Baker Reissue patent, is pretreated in the manner set forth in the copending application of Donald W. Ohlmeyer, Serial No. 654,677, filed April 24, 1957. In accordance with this procedure, the commercial enzyme preparation is heated in an aqueous dispersion to a temperature between about 50° and 80° C. for a period of time and under conditions to remove certain impurities from the glucose oxidase. The pH of the dispersion so heated is usually between about 4 and 8 and the time is usually between about 2 minutes and 10 hours depending upon the temperature used. The conditions of treatment are such that the glucose oxidase and catalase are not destroyed and they thus serve to protect the mayonnaise against oxidative deterioration. On the other hand, certain other biologically active ingredients are removed from the glucose oxidase-catalase preparation by this treatment, and the resulting mayonnaise is thus not subjected to emulsion breakdown or other types of deterioration upon storage.

For a come complete understanding of this invention, reference will now be made to a specific example which will illustrate the manner in which the pretreated glucose oxidase-catalase preparation may be incorporated into the mayonnaise. The following ingredients were employed to prepare a 100 pound batch of mayonnaise:

| | Pounds |
|---|---|
| Corn oil | 77.5 |
| Vinegar (10% acetic acid) | 4.0 |
| Water | 7.0 |
| Sodium chloride | 1.3 |
| Mustard flour | 0.5 |
| Sucrose | 2.4 |
| Liquid egg yolks | 7.3 |

In formulating the above ingredients, 4 pounds of mayonnaise at 68° F. from a previous batch were added to the liquid egg yolk which was at a temperature of 35° F. These ingredients were placed in a conventional mayonnaise mixer or blender and 0.4 pound of vinegar and 0.7 pound of water followed by 2.4 pounds of sucrose, 1.3 pounds of sodium chloride and 0.5 pound of mustard flour were added. The batch was mixed for two minutes and 7.7 milliliters of an enzyme preparation of the character hereinafter described were added. The concentration of glucose oxidase in the enzyme preparation was about 750 units per milliliter. After the glucose oxidase preparation was added, the composition was mixed for an additional minute and thereafter were gradually added 77.5 pounds of corn oil and the remaining water and vinegar. This was done in such a manner that all of the ingredients in the mixer had been added within about 6.5 minutes. After all the ingredients had been added, the mixture was blended for another 45 seconds in order to produce the desired mayonnaise product. The mixer employed was one that is conventionally used in mayonnaise manufacture and served to emulsify the ingredients and incorporate air in the form of minute bubbles into the product. The product contained about 15% by volume of air. The mayonnaise was then packaged in sealed jars in the usual manner. After over five months of storage at room temperature, the product was substantially unchanged and retained its original consistency, flavor and appearance.

The glucose oxidase preparation referred to in the foregoing example was a commercial product prepared essentially in the manner disclosed in the Baker reissue patent in the form of a clear amber solution containing catalase and about 750 units of glucose oxidase per milliliter. About 200 milliliters of this solution in a glass bottle were heated in an air oven maintained at 60° C. for about 30 minutes during which time a precipitate was formed. This precipitate was separated by filtration and the resulting purified preparation was employed to impart stability to the mayonnaise as herein defined. By this treatment the proteolytic enzyme was removed but the glucose oxidase and catalase was unimpaired.

Storage tests have been made on mayonnaise prepared as indicated in the foregoing example and compared with mayonnaise to which no glucose oxidase preparation was added and with mayonnaise to which an untreated glucose oxidase preparation was added. Mayonnaise containing no added enzyme showed evidences of browning and other oxidative deterioration after three to four months, and mayonnaise containing added enzyme, but untreated, showed evidence of emulsion separation after this period of time. The mayonnaise preparation containing the treated glucose oxidase was by far the most stable and was virtually unchanged after about four months, there being no observable emulsion breakdown, color change or change in flavor.

The term "mayonnaise" as used in this specification and in the appended claims is intended to embrace those food products that are commonly known to the food industry as mayonnaise. These are food products consisting essentially of an emulsion of water, egg yolks, and an edible vegetable oil, the amount of oil being in excess of about 50% by weight. The product is whipped or is otherwise blended to develop the desired emulsion, and a gas, such as air, is usually simultaneously incorporated in the amount of about 10% to 20% by volume. This invention is particularly suitable for preventing oxidative deterioration of the mayonnaise which may be caused in part by the oxygen contained in the entrained air in the product. However, the oxygen that may be present in the head space above the surface of the mayonnaise is also removed. Likewise any oxygen that may be introduced into the container when the cap is removed and replaced by the ultimate consumer will be removed and the storage life of mayonnaise in a partially used container is thereby increased. Glucose may be added, but usually it is not necessary because egg yolk contains sufficient glucose to react with the free oxygen that may be present in the product.

Accordingly, it will be apparent from the foregoing description that a mayonnaise product has been provided which has an increased shelf life and which may be prepared without departing from the usual methods that are employed in making mayonnaise.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A process for stabilizing mayonnaise containing a small amount of glucose which comprises adding thereto a glucose oxidase enzyme preparation which has been preheated in the presence of water to a temperature between about 50 and 80° C. to inactivate certain impurities contained therein.

2. A process which comprises heating a glucose oxidase enzyme preparation to a temperature between about 50 and 80° C. whereby to inactivate certain heat labile impurities therein without substantial destruction of the glucose oxidase activity thereof, and thereafter incorporating a small amount of the resulting substance into mayonnaise.

3. A mayonnaise composition characterized by storage stability containing glucose and a glucose oxidase preparation which, prior to incorporation into the mayonnaise, has been heated to a temperature between 50 and 80° C. for a time sufficient to inactivate certain impurities therein.

4. The composition recited in claim 3 wherein the amount of glucose oxidase in said mayonnaise is greater than 10 units per pound.

5. The composition recited in claim 3 wherein the amount of glucose oxidase in said mayonnaise is between about 20 and 200 units per pound.

6. A mayonnaise composition containing essentially an emulsion of oil, water, and liquid egg yolk including glucose and having added thereto an enzyme preparation containing catalase and glucose oxidase in the amount of between about 20 and 200 units of glucose oxidase per pound of mayonnaise, said preparation, prior to incorporation into the mayonnaise, having been heated to a temperature of between about 50 and 80° C. for a time sufficient to inactivate certain impurities therein.

References Cited in the file of this patent

UNITED STATES PATENTS

Re. 23,523    Baker _____ July 22, 1952

OTHER REFERENCES

Chemistry and Technology of Enzymes, by Tauber, 1949, by John Wiley & Sons, Inc. (N.Y.), page 64.

The Enzymes, Sumner and Myrback, vol. II, part 1, 1951, page 764.

Advances in Enzymology, vol. 14, 1953, pp. 396 to 397.